(12) United States Patent
Lamberth, Jr. et al.

(10) Patent No.: US 8,792,070 B2
(45) Date of Patent: Jul. 29, 2014

(54) POLARIZATION PLATE FOR USE IN A LIQUID CRYSTAL DISPLAY

(75) Inventors: L. S. Lamberth, Jr., Scottsdale, AZ (US); Ravindra R. Laddu, Peoria, AZ (US); Brent D. Larson, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 1152 days.

(21) Appl. No.: 11/689,105

(22) Filed: Mar. 21, 2007

(65) Prior Publication Data
US 2008/0232080 A1    Sep. 25, 2008

(51) Int. Cl.
*G02F 1/1335* (2006.01)
*G02B 5/30* (2006.01)

(52) U.S. Cl.
USPC ............... 349/96; 349/61; 349/64; 349/65; 362/19; 359/485.01; 359/485.03

(58) Field of Classification Search
None
See application file for complete search history.

(56) References Cited

U.S. PATENT DOCUMENTS

| | | | | |
|---|---|---|---|---|
| 5,305,126 A * | 4/1994 | Kobayashi et al. | ............. | 349/94 |
| 5,422,756 A * | 6/1995 | Weber | ............................ | 359/487 |
| 5,751,388 A | 5/1998 | Larson | | |
| 5,899,551 A * | 5/1999 | Neijzen et al. | ................. | 349/115 |
| 6,025,890 A * | 2/2000 | Chase | ................................ | 349/9 |
| 6,364,497 B1 * | 4/2002 | Park et al. | ...................... | 362/627 |
| 6,392,727 B1 | 5/2002 | Larson et al. | | |
| 6,985,291 B2 * | 1/2006 | Watson et al. | ................. | 359/490 |
| 2002/0021387 A1 | 2/2002 | Larson | | |
| 2002/0085281 A1 | 7/2002 | Dubin et al. | | |
| 2005/0185113 A1 * | 8/2005 | Weindorf et al. | ............... | 349/71 |
| 2005/0253509 A1 * | 11/2005 | Schaepkens et al. | ......... | 313/506 |
| 2006/0082698 A1 | 4/2006 | Ko et al. | | |
| 2007/0030415 A1 | 2/2007 | Epstein | | |

FOREIGN PATENT DOCUMENTS

| | | |
|---|---|---|
| EP | 0884620 A2 | 12/1998 |
| EP | 1258749 A2 | 11/2002 |
| EP | 1258749 A3 | 11/2002 |
| JP | 2005-265896 | 9/2005 |
| TW | I238900 B | 9/2005 |
| TW | 200630706 | 9/2006 |
| WO | 2006124588 A1 | 11/2006 |

OTHER PUBLICATIONS

EP Search Report, EP 08102787.2-2205 dated Mar. 16, 2011.
TW Office Action and Search Report for application No. 097109932 dated Oct. 4, 2013.
JP Notice for Application No. 2008-073835 dated Nov. 8, 2012.

* cited by examiner

*Primary Examiner* — Michael Caley
(74) *Attorney, Agent, or Firm* — Ingrassia Fisher & Loernz, P.C.

(57) ABSTRACT

A polarization plate is provided for use between a light source and a display panel, where the light source is configured to emit light having a plurality of planes of polarization and the display panel is configured to have a predetermined polarization axis. The plate includes a repolarization region and a prepolarization region. The repolarization region is configured to diffuse and to depolarize or rotate at least one plane of polarization of the light passing therethrough. The prepolarization region is disposed adjacent to and in contact with the repolarization region. The prepolarization region is configured to be substantially nonabsorbent, to allow passage of light having a plane of polarization that is substantially aligned with the predetermined polarization axis, and to prevent passage of light having a plane of polarization that is not substantially aligned with the predetermined polarization axis. In another embodiment, an interface is provided between the regions.

7 Claims, 5 Drawing Sheets

POLARIZATION PLATE FOR USE IN A LIQUID CRYSTAL DISPLAY

TECHNICAL FIELD

The inventive subject matter generally relates to liquid crystal displays, and more particularly relates to a polarization plate for use in a liquid crystal display.

BACKGROUND

Conventional liquid crystal displays include a reflective cavity, a light source, a display panel, and a diffuser. The light source is positioned such that it can inject light into the reflective cavity. The reflective cavity can take several general forms, such as a reflective surface forming one or more sides of an enclosure around the light source. Such reflective cavities can include a transparent light guide which is illuminated or edge lit along one or more edges. The display panel is spaced apart from the reflective cavity and may include a rear polarizer configured to allow passage of light having a plane of polarization that is substantially aligned with a predetermined polarization axis. The diffuser is typically disposed between the reflective cavity and the display panel and is configured to enhance the uniformity of light exiting the reflective cavity, including light that has a plane of polarization that is substantially aligned with the predetermined polarization axis.

Manufacturers typically incorporate liquid crystal display components that may be capable of optimizing energy usage, while having minimal weight, thickness, and cost. For example, manufacturers traditionally include diffusers formed of thin, highly transmissive materials having a surface texture on one or both sides to enhance light diffusion. The diffuser is typically placed such that an air gap is maintained between the diffuser and the other display components. The air gap enhances the diffusion properties of the diffuser and in addition reduces the likelihood of light absorption by non-ideal components in the vicinity of the diffuser. To further enhance energy efficiency, a pre-polarizing thin plastic film may be included that recycles unpassed light for subsequent passage through the diffuser or reflective cavity. The pre-polarizing film has conventionally been disposed between the diffuser and the display panel. In some display configurations, the pre-polarizing film specularly reflects light back to the diffuser and the reflective cavity which then return a portion of the light toward the display panel such that some of the reflected light becomes reoriented and allows passage of light that is substantially aligned with the polarization axis of the display panel. In other configurations, the pre-polarizing film backscatters the unpassed light but allows passage of light that is substantially aligned with the display panel polarization axis.

Although the above-described configurations have been adequate for smaller displays, they have exhibited drawbacks. In particular, as liquid crystal display sizes increase the structural integrity of certain sections of the film may become difficult to maintain. For example, the center of the film may become distorted or may inadvertently contact other display components when the display is shaken, dropped, or exposed to extreme thermal or humid environments.

One prior art method which can minimize film damage is lamination of a specular pre-polarizing film to a rear polarizer and applying the two to the display panel as a single sheet. However, it has been found that laminating the two polarizers together may undesirably alter some optical and physical characteristics of the liquid crystal display and may not be suitable for certain applications, such as avionics or military purposes. For example, the luminance, viewing angle, uniformity, or environmental performance of the liquid crystal display may not meet certain regulations that are set for displays used in avionics or military applications.

Accordingly, it is desirable to have a liquid crystal display that maintains structural and environmental integrity when produced in large sizes or used in demanding environments. In addition, it is desirable for the liquid crystal display to operate efficiently and to produce a high luminance that is suitable for use in avionics, military applications and commercial applications. Further, it is desirable for the liquid crystal display to have a wider illumination and viewing angle as compared to conventional displays. Moreover, it is desirable for the liquid crystal display to be relatively simple and inexpensive to manufacture. Furthermore, other desirable features and characteristics of the inventive subject matter will become apparent from the subsequent detailed description and the appended claims, taken in conjunction with the accompanying drawings and this background.

BRIEF SUMMARY

A component is provided for use between a light source and a display panel of a liquid crystal display, the light source configured to emit light having one or more planes of polarization and the display panel configured to have a predetermined polarization axis. Display devices including the component are also provided.

In an embodiment, and by way of example only, the component includes a plate, a repolarization region, and a prepolarization region. The plate includes a first major surface, a second major surface opposing the first major surface, and an edge joining the first and second major surfaces. The first major surface is configured to allow a majority of incident light from the light source to be transmitted therethrough toward the second major surface. The repolarization region is between the first and second major surfaces and configured to receive a majority of light transmitted through the first major surface. The repolarization region is configured to diffuse and to change polarization or rotate at least one plane of polarization of the light passing therethrough. The prepolarization region is formed between the first and second major surfaces adjacent to and in contact with the repolarization region. The prepolarization region is configured to be substantially non-absorbent, to allow passage of light through the second major surface having a plane of polarization that is substantially aligned with the predetermined polarization axis, and to prevent passage of light through the second major surface having a plane of polarization that is not substantially aligned with the predetermined polarization axis. The light is not injected between the repolarization region and the prepolarization region and is not injected through the plate edge.

In another embodiment, by way of example only, the component includes a plate, a repolarization region, an interface, and a prepolarization region. The plate includes a first major surface, a second major surface opposing the first major surface, and an edge joining the first and second major surfaces, and the first major surface is configured to allow a majority of incident light from the light source to be transmitted therethrough toward the second major surface. The repolarization region is between the first and second major surfaces and configured to receive a majority of light transmitted through the first major surface. The repolarization region is configured to diffuse and to change polarization or rotate at least one plane of polarization of the light passing therethrough. The interface is between the first and second major surfaces and has a first side and a second side. The interface first side is disposed adjacent to and in contact with the repolarization region. The prepolarization region is formed between the first and second major surfaces adjacent to and in contact with the interface, and is configured to be substantially nonabsorbent, to allow passage of light through the second major surface having a plane of polarization that is substantially aligned with the predetermined polarization axis, and to prevent passage of light through the second major surface having a plane of polarization that is not substantially aligned with the predetermined polarization axis. The light is not injected between the repolarization region and the prepolarization region or the interface and is not injected through the plate edge.

In another embodiment, by way of example only, a display device includes a light source, a reflective surface, a polarized display panel, and a component. The reflective surface is disposed proximate the light source and configured to reflect light emitted therefrom. The polarized display panel is spaced apart from the reflective surface, the polarized display panel having a predetermined polarization axis. The component is disposed between the reflective surface and the polarized display panel and configured to receive the reflected light. The polarization plate includes a plate, a repolarization region, and a prepolarization region. The plate includes a first major surface, a second major surface opposing the first major surface, and an edge joining the first and second major surfaces, and the first major surface is configured to allow a majority of incident light from the light source to be transmitted therethrough toward the second major surface. The repolarization region is between the first and second major surfaces and configured to receive a majority of light transmitted through the first major surface. The repolarization region is configured to diffuse and to change polarization or rotate at least one plane of polarization of the light passing therethrough. The prepolarization region is formed between the first and second major surfaces adjacent to and in contact with the repolarization region. The prepolarization region is configured to be substantially nonabsorbent, to allow passage of light through the second major surface having a plane of polarization that is substantially aligned with the predetermined polarization axis, and to prevent passage of light through the second major surface having a plane of polarization that is not substantially aligned with the predetermined polarization axis. The light is not injected between the repolarization region and the prepolarization region and is not injected through the plate edge.

In still another embodiment, by way of example only, the display device includes a light source, a reflective surface disposed proximate the light source and configured to reflect light emitted therefrom, a polarized display panel spaced apart from the reflective surface, the polarized display panel having a predetermined polarization axis, and a component disposed between the reflective surface and the polarized display panel and configure to receive the reflected diffuse light. The component includes a plate, a repolarization region, an interface, and a prepolarization region. The plate includes a first major surface, a second major surface opposing the first major surface, and an edge joining the first and second major surfaces, and the first major surface is configured to allow a majority of incident light from the light source to be transmitted therethrough toward the second major surface. The repolarization region is between the first and second major surfaces and configured to receive a majority of light transmitted through the first major surface. The repolarization region is configured to diffuse and to change polarization or rotate at least one plane of polarization of the light passing therethrough. The interface is between the first and second major surfaces and has a first side and a second side. The interface first side is disposed adjacent to and in contact with the repolarization region. The prepolarization region is between the first and second major surfaces adjacent to and in contact with the interface. The prepolarization region is configured to be substantially nonabsorbent, to allow passage of light through the second major surface having a plane of polarization that is substantially aligned with the predetermined polarization axis, and to prevent passage of light through the second major surface having a plane of polarization that is not substantially aligned with the predetermined polarization axis. The light is not injected between the repolarization region and the prepolarization region or the interface and is not injected through the plate edge.

In still yet another embodiment, by way of example only, a component includes a plate, a repolarization region, and a prepolarization region. The plate includes a first major surface, a second major surface opposing the first major surface, and an edge joining the first and second major surfaces, and the first major surface is configured to allow a majority of incident light from the light source to be transmitted therethrough toward the second major surface. The repolarization region is between the first and second major surfaces and is configured to receive and diffuse light from the light source and to depolarize or rotate at least one plane of polarization of the light passing therethrough. The prepolarization region is between the first and second major surfaces adjacent to and is in contact with the repolarization region. The prepolarization region is configured to be substantially nonabsorbent, to allow passage of light having a first polarization, and to prevent passage of light having a second polarization. The light is not injected between the repolarization region and the prepolarization region or the interface and is not injected through the plate edge.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the preceding background or the following detailed description.

Figure 1:
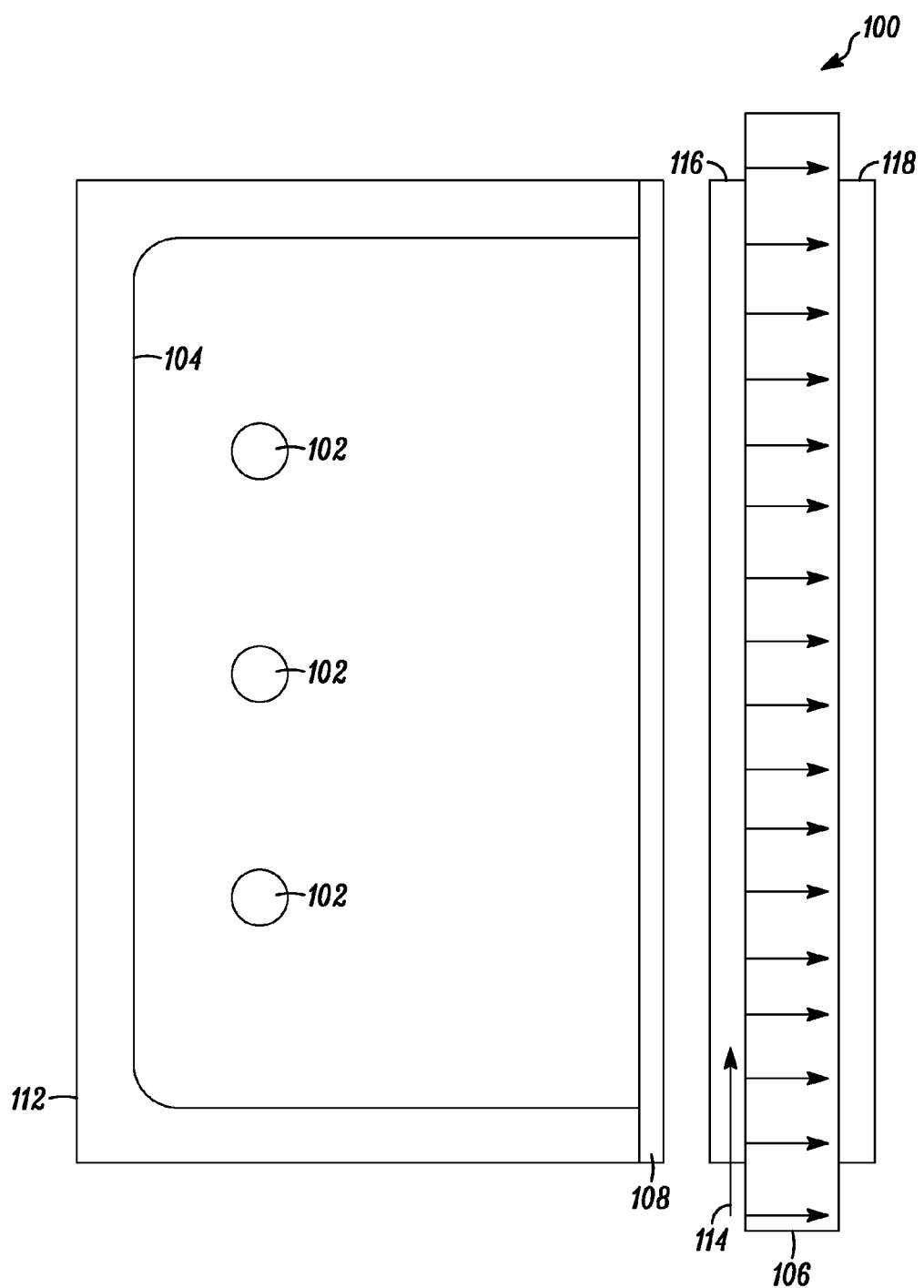
FIG. 1 is a simplified cross-sectional view of a display device according to an embodiment.

Turning now to FIG. 1, a simplified cross-sectional view of a display device 100 is shown according to an embodiment. The display device 100 may be any one of numerous types of display devices that operate by polarizing light in a predetermined direction for display. Examples of suitable display devices 100 include liquid crystal display devices, including, but not limited to, active matrix liquid crystal display devices, passive matrix liquid crystal display devices, and directly addressed liquid crystal display devices.

The display device 100 includes a light source 102, a reflective surface 104, a polarized display panel 106, and a polarization plate 108. The light source 102 may be in operative communication with a power source (not shown) or may be self-powered. In an embodiment, the light source 102 may produce unpolarized light that may be diffuse or direct. In another embodiment, the light source 102 may produce light that may be polarized having a particular orientation. Suitable devices for use as the light source 102 include, but are not limited to one or more fluorescent lamps, light emitting diodes, incandescent lamps, lasers and electrical discharge lamps. The light source 102 is disposed such that at least a portion of light therefrom is directed toward the reflective surface 104 or toward the polarization plate 108.

The reflective surface 104 reflects at least a portion of the light from the light source 102 toward the polarized display panel 106 and the polarization plate 108. The light may change polarization when reflected. The reflective surface 104 may be made of a material capable of reflecting light or may be a coated with a reflective material. Suitable materials include, but are not limited to materials that may be smooth and white, or may have a mirrored surface. To maximize usage of light from the light source 102, the reflective surface 104 may be part of an inner surface of an enclosure 112 configured to form a cavity into which the light is injected. While a simple box-like cavity is depicted in FIG. 1, other conventional cavities such as edgelit cavities may also be used. In an edgelit cavity the reflective surface 104 may further include a transparent light guide to aid in evenly distributing light.

The polarized display panel 106 is spaced apart from the light source 102 and the reflective surface 104 and is configured to receive a portion of the light therefrom. In an embodiment, the polarized display panel 106 has a predetermined polarization axis 114 so that passage is limited to incident light polarized in a particular orientation that is substantially aligned with the predetermined polarization axis 114. In this regard, the polarized display panel 106 may be an active matrix liquid crystal display, super twisted nematic liquid crystal display, ferroelectric liquid crystal display, or other light modulator capable of manipulating the polarization of light. In many such displays, the polarization axis 114 may represent a polarization plane as is well understood in the art. In these cases, the polarization axis 114 shown may be the intersection of the polarization plane and the surface plane, and may correspond to the electric field vector of normally incident light for which passage is allowed.

The polarized display panel 106 may additionally include a rear polarizer 116 disposed on one side. The rear polarizer 116 may be configured to ensure that light entering the polarized display panel 106 is aligned with the predetermined polarization axis 114. In another embodiment, the polarized display panel 106 may also include a front polarizer 118 disposed on the opposite side. The front polarizer 118 may further filter light to enhance clarity or contrast for a viewer of the display 100. In this regard, the front polarizer 118 may operate by allowing passage of light aligned with a polarization axis, which may or may not be substantially similar to the predetermined polarization axis 114 of the rear polarizer 116.

In any case, before light is received by the polarized display panel 106, it passes through the polarization plate 108. The polarization plate 108 may be attached along its perimeter to the enclosure 112. Attachment may be provided, for example, by mechanical fixturing which minimizes light leakage around the perimeter of the attachment region. In an embodiment, a central area of polarization plate 108 may not be directly attached to the enclosure 112, the reflective surface 104 or the light source 102, and may be separated from those components by a low refractive index medium such as air. The polarization plate 108 is configured to diffuse and to prepolarize at least a portion of the incident light from the light source 102 and the reflective surface 104 before it reaches the polarized display panel 106. In an embodiment, the polarization plate 108 prepolarizes the light in a predetermined orientation that is substantially aligned with the predetermined polarization axis 114 and is configured to allow passage of such light therethrough. In another embodiment, to increase energy efficiency of the display device 100 the polarization plate 108 may additionally be configured to continuously recycle a portion of the light that is not suitably aligned with the predetermined polarization axis 114 until it is re-oriented and aligned substantially similarly to the predetermined polarization axis 114 and allowed to pass through to the polarized display panel 106.

Figure 2:
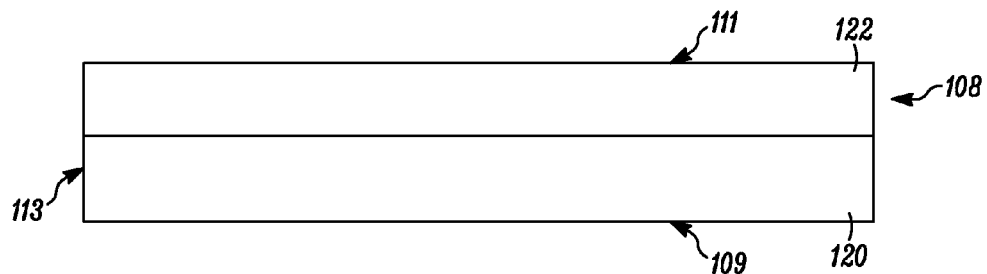
FIG. 2 is a cross-sectional view of a polarization plate that may be implemented into the display device shown in FIG. 1, according to an embodiment.
Figure 3:
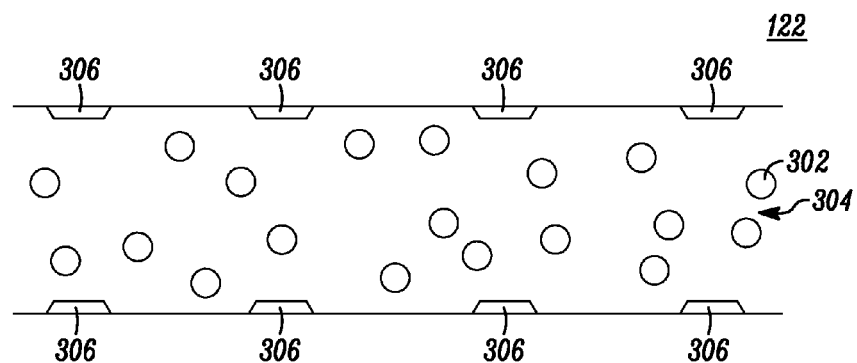
FIGS. 3-6 are cross-sectional views of prepolarization regions of several polarization plates, according to several embodiments.

FIG. 2 is a cross-sectional view of the polarization plate 108 that may be implemented into the display device 100 shown in FIG. 1, according to an embodiment. The polarization plate 108 is a unitary structure having a first major surface 109, a second major surface 111 opposite the first major surface 109, and an edge 113. The first and second major surfaces 109, 111 are joined together by the edge 113. In an embodiment, the first major surface 109 is configured to allow a majority of incident light from the light source and from the reflective surface 104 to be transmitted therethrough toward the second major surface 111.

The polarization plate 108 also includes a repolarization region 120 and a prepolarization region 122, each disposed between the first and second major surfaces 109, 111. The repolarization region 120 is configured to diffuse and to depolarize or rotate at least one plane of polarization of the light passing therethrough. In one embodiment, the repolarization region 120 may have a thickness that allows it to be a semi-rigid and self-supporting structure. In this embodiment, the repolarization region 120 may be configured to have properties similar to those of a volume diffuser, allowing a portion of the incident light to be passed or forward-scattered and a portion of the incident light to be back-scattered. For example, the repolarization region 120 may have a microscopically varying refraction index throughout.

In another embodiment, the repolarization region 120 may be configured to diffuse light in a manner similar to that of a surface diffuser. In an example, the repolarization region 120 may have a substantially uniform birefringent refraction index throughout and may include a surface texture on a surface. In yet another embodiment, the repolarization region 120 may be relatively thin and flexible, such as a film.

The prepolarization region 122 receives the light that has passed through the repolarization region 120. In an embodiment, the prepolarization region 122 is configured to further filter the passed light by allowing passage of light having a plane of polarization that is substantially aligned with the predetermined polarization axis 114 and preventing passage of light having a plane of polarization that is not substantially aligned with the predetermined polarization axis 114. To further enhance energy efficiency, the prepolarization region 122 may be a non-absorbing structure. For example, the prepolarization region 122 may be configured to specularly reflect light or to backscatter light which is not substantially aligned with the predetermined polarization axis 114. Although the prepolarization region 122 is shown in FIG. 2 as having an exterior surface interfacing with air, any other medium may be in contact therewith. For example, the prepolarization region 122 may include an absorbing polarizer (not shown) adjacent thereto. The absorbing polarizer may have a polarization axis that is substantially similar to the predetermined polarization axis 114 of the prepolarization region 122 and may be attached as rear polarizer 116 of display panel 106.

Some examples of suitable structures that may be implemented into the prepolarization region 122 are shown in FIGS. 3-6. In an embodiment shown in FIG. 3, the prepolarization region 122 may be a backscattering uniaxial structure that includes liquid crystal droplets 302 dispersed in a polymer matrix 304. The liquid crystal droplets 302 may be homogeneously aligned in the polymer matrix 304 and may be separate or interconnected, and with either symmetrical or nonsymmetrical shapes. The particular liquid crystal from which the droplets 302 are made may be selected such that either an ordinary or extraordinary refractive index thereof matches a corresponding refractive index of the polymer matrix 304. In an embodiment, alignment of the liquid crystal in the droplets 302 may be induced physically, such as by stretching. In another embodiment, liquid crystal alignment may be induced by applying an electric or a magnetic field in an appropriate field direction, via for example, optional electrodes 306. In another embodiment consistent with FIG. 3, regions 302 may instead represent polymer domains with a refractive index matching the refractive index of polymer matrix 304 for a first polarization axis and with a refractive index mismatch for a second polarization axis.

Figure 4:
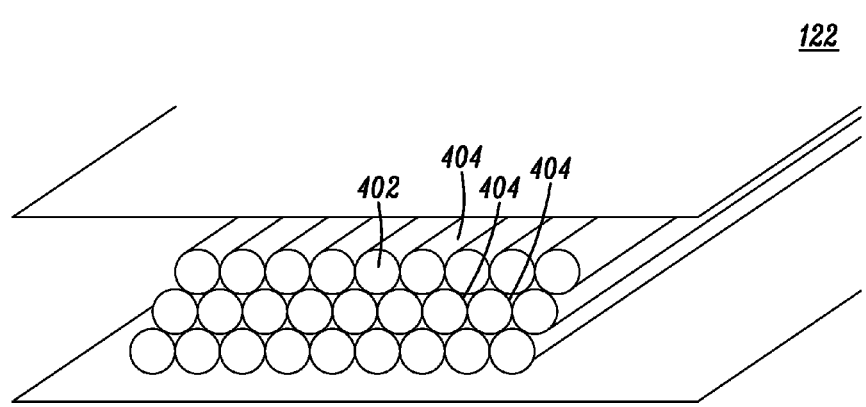

In still another backscattering embodiment, as shown in FIG. 4, the prepolarization region 122 may include transparent fibers 402 that are aligned with each other and embedded in a polymer matrix 404. The transparent fibers 402 may or may not be birefringent. In the case of birefringent transparent fibers 402, a non-birefringent polymer matrix 404 may be employed. In the case of non-birefringent transparent fibers (e.g., glass fibers), a birefringent polymer matrix (e.g., polymeric liquid crystal) may be used.

Figure 5:
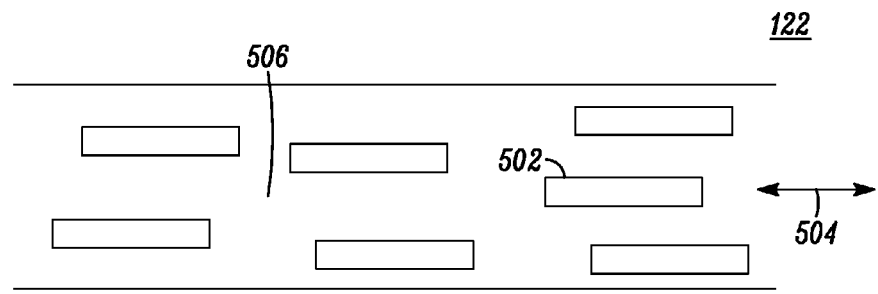

Another example of a suitable backscattering structure for the prepolarization region 122 is shown in FIG. 5. In this embodiment, the prepolarization region 122 may include birefringent crystals 502 that that are aligned along an axis 504. The birefringent crystals 502 may be embedded in a non-birefringent polymer matrix 506.

Figure 6:
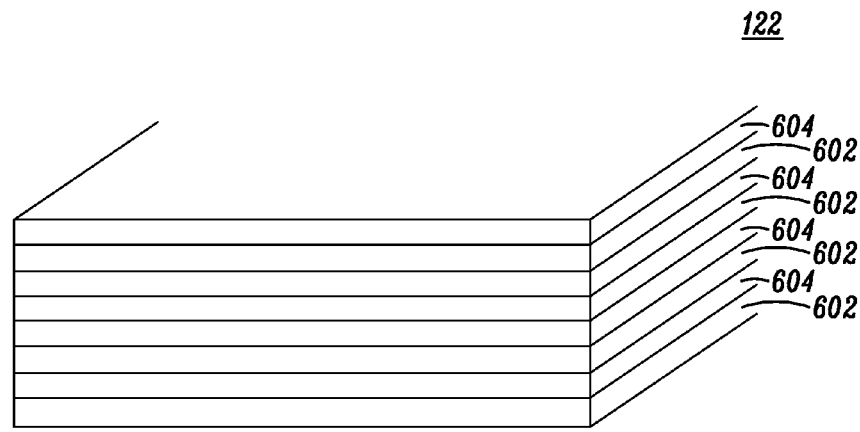

According to another embodiment, shown in FIG. 6, the prepolarization region 122 may be made up of alternating layers 602 and 604 of polymer materials having differing birefringence. Here, the refractive index of layers 602 and layers 604 are substantially matched for a first polarization axis and are a mismatch for a second polarization axis.

In one exemplary embodiment, the prepolarization region 122 may be configured to have characteristics that are similar to those of the VIKUITI™ Diffuse Reflective Polarizer Films available through 3M Corporation of St. Paul, Minnesota. In another embodiment, the prepolarization region 122 may be configured to operate similarly to a VIKUITI™ Dual Brightness Enhancement Film available through 3M Corporation of St. Paul, Minnesota. Other non-absorbing polarizers may also be used, including but not limited to cholesteric structures and wire-grid polarizing structures.

Referring again to FIG. 2, the two regions 120, 122 may be in contact with each other or adhered to each other in any suitable manner. For example, if the repolarization region 120 is semi-rigid and the prepolarization region 122 is flexible, the prepolarization region 122 may be laminated directly onto the repolarization region 120. In the case of a flexible repolarization region 120 and a semi-rigid prepolarization region 122, the two regions 120, 122 may for example be laminated to each other or the repolarization region 120 may be applied to the prepolarization region 122 as a coating. In an embodiment in which the repolarization region 120 and the prepolarization region 122 are both flexible, the two regions 120, 122 may be laminated to each other or coextruded with one another. Alternatively, the repolarization region 120 may be coated with material suitable for forming the prepolarization region 122. In another embodiment, the two regions 120, 122 are formed as a continuously graded structure.

Figure 7:
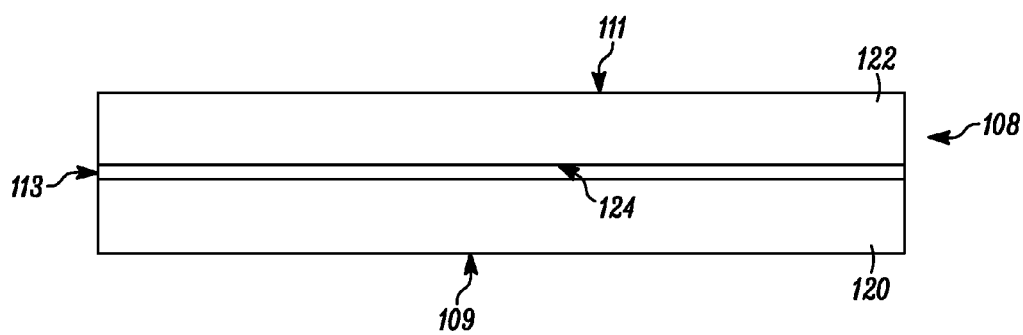
FIG. 7 is a cross-sectional view of a polarization plate that may be implemented into the display device shown in FIG. 1, according to another embodiment.

In still another embodiment, as shown in FIG. 7, the polarization plate 108 may include an interface 124 that is disposed or formed between the two regions 120, 122. The interface 124 may be a transparent material having a refractive index that is substantially similar to that of the repolarization region 120 and the prepolarization region 122. In another embodiment, the interface 124 may be configured to modulate at least one plane of polarization of the light from a first orientation to a second orientation. For example, in an embodiment, the interface 124 may be constructed similarly to a quarterwave retarder, and the repolarization region 120 may be configured to preserve polarization. In such case, the repolarization region 120 and the interface 124 cooperate to accomplish polarization rotation.

The interface 124 may serve as a semi-rigid structure to which a flexible repolarization region 120 and a flexible prepolarization region 122 are adhered. In such case, the repolarization region 120 and the prepolarization region 122 may be laminated onto the interface 124. Alternatively, suitable materials forming the repolarization region 120 and the prepolarization region 122 may be used to coat each side of the interface 124. In an embodiment, each of the repolarization region 120, the prepolarization 122, and the interface 124, if included, may be substantially uniform in thickness and construction along the directions perpendicular to the display panel 106 normal.

Figure 8:
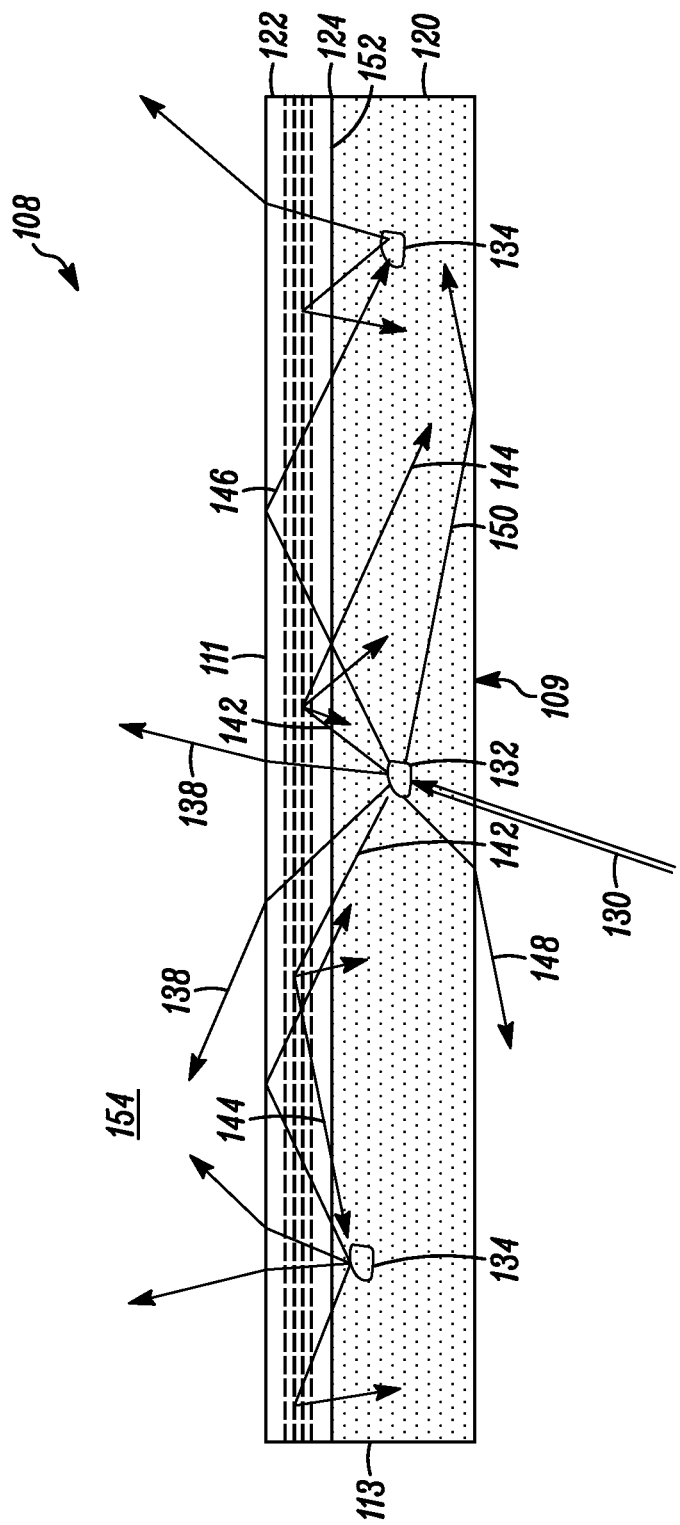
FIG. 8 is a simplified illustration of an embodiment of light propagating through a polarization plate.

FIG. 8 is a simplified illustration of an embodiment of light propagating through a polarization plate 108. In this embodiment, the polarization plate 108 includes adjacent repolarization and prepolarization regions 120, 122 that are substantially index-matched at the interface 124. The repolarization and prepolarization regions 120, 122 are both configured to diffuse light. However, the repolarization region 120 is further configured to receive polarized light from the prepolarization region 122 and return substantially unpolarized or randomly polarized light to the prepolarization region 122, while the prepolarization region 122 is further configured to allow passage of light polarized along a predetermined axis substantially undeflected and backscatter light polarized along another axis.

Light is injected through the first major surface 109 and not between the repolarization and prepolarization regions 120, 122 or the polarization plate edge 113. When the light passes through the repolarization region 120, some light rays 130 may be incident upon a subregion 132 of the repolarization region 120. Although the light rays 130 are shown as coming from a single direction, for example from the lightsource 102 or reflective surface 104, both of FIG. 1, it will be appreciated that the light rays 130 may include other rays incident upon the subregion 132 from more than one direction. The light rays 130 may also include those from adjacent subregions 134 and others not shown. The subset of light rays 130 which arrive from the lightsource 102 or reflective surface 104 may be incident through a first major surface 109 of the polarization plate 108. The first major surface 109 may interface with air.

The subregion 132 may scatter the light rays 130 having random polarization in random directions. For example, in an embodiment, a first portion of the light rays 138 are scattered from the subregion 132 in the general direction of and with a polarization matching the polarization axis of the prepolarization region 122. The first portion of the light rays 138 may then reach a second major surface 111 of the polarization plate 108 with an angle of incidence which allows the majority of the light energy to refract into the exterior medium, such as air. This portion is well suited to match the predetermined polarization axis 114 of FIG. 1. A second portion of the light rays 142 is scattered from the subregion 132, but has a polarization that may be backscattered by the prepolarization region 122. In such case, a majority of the light energy associated with the second portion of the light rays 142 may be returned to the repolarization region 120 in the form of backscattered rays 144 without reaching the second major surface 111.

A third portion of the light rays 146 may exit the subregion 132 with a polarization which may be transmitted by the prepolarization region 122 but that may exceed a critical or acceptable angle for refraction out of the polarization plate 108. As a result, the third portion of the light rays 146 may be reflected via total internal reflection ("TIR") back toward the repolarization region 120. The light energy in the third portion of the light rays 146 may then return to repolarization region 120, for example to adjacent subregions 134, for another opportunity to scatter and exit the repolarization region 120 in a manner similar to the first portion of light rays 138. In one embodiment, a further portion of the light rays 148 are backscattered and exit the repolarization region 120 in a direction opposite that of the prepolarization region 122.

In another embodiment, a portion of the light rays 150 undergo TIR at the first major surface 109 of the polarization plate 108. Such a result may occur when an angle of incidence of the returned light rays 150 (or other light rays) with respect to the corresponding interface surface normal exceeds a critical angle for TIR. In either case involving TIR, the critical angle for TIR at a substrate-to-air boundary ("air critical angle"), such as the boundary between air 154 and the first or second major surfaces 109, 111 of the polarization plate 108, may vary with a particular refractive index of the material from which the particular region may be made. For example, optical materials such as plastic or glass typically exhibit an air critical angle in the range of 27 degrees (n=2.2) to 49 degrees (n=1.33). For materials having a refractive index of n=1.5, such as certain common glass or plastic materials, the air critical angle may be about 42 degrees from normal. In the embodiment of FIG. 8, it is evident that light, for example portions of light rays 142, 144 and 146, passes between repolarization region 120 and prepolarization region 122 and through the interface 124 at angles which exceed the air critical angles for the materials in the corresponding regions.

Figure 9:
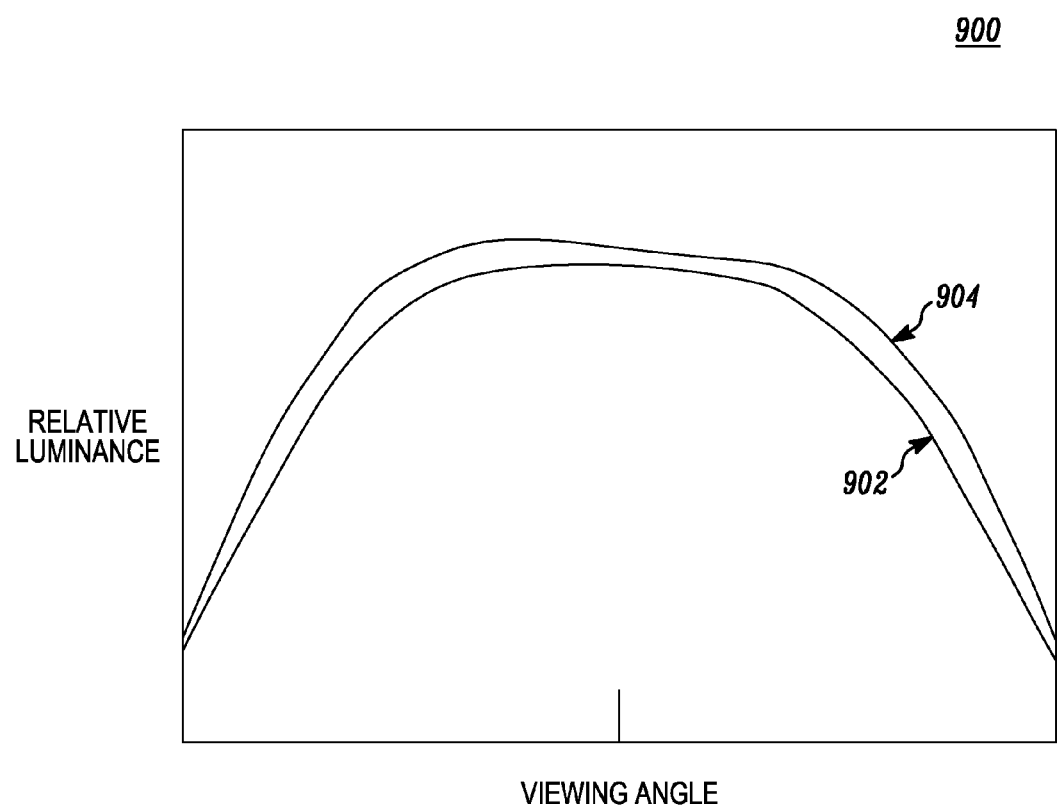
FIG. 9 is a graph comparing relative luminance measurements obtained from a conventional liquid crystal display and a display including a polarization plate.

The polarization plate 108 described above may provide increased luminance from various viewing angles when compared to conventional liquid crystal displays including a diffuser, a pre-polarizing film, and a rear polarizer separated from each other by airgaps. In one particular experiment, relative luminance was measured over a range of horizontal viewing angles while maintaining a vertical viewing angle of 0 degrees. The relative luminance was then plotted onto a graph 900, shown in FIG. 9. Data representing relative luminance of a conventional liquid crystal display with a prepolarizing film is shown as line 902, while data representing relative luminance of a liquid crystal display including the polarization plate 108 is shown as line 904. As shown in the graph 900, the liquid crystal display including the polarization plate 108 has increased luminance over that of the conventional device, especially at wide viewing angles. Direct comparisons with laminated assemblies of non-diffuse layers are not meaningful, as the presence of diffusion introduces complex interactions as was exemplified in FIG. 8. For example, rather than simple improvement as might be associated with elimination of surface reflections, previous findings in which diffusers were laminated directly to rear polarizers have shown overall reduction of efficiency.

In addition to increasing efficiency of the display device 100, the inclusion of the polarization plate 108 may reduce overall size and/or thickness of the display device 100. Additionally, display devices that include the polarization plate 108 may be more structurally robust than conventional display devices having comparable functionality.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A component for use between a light source and a display panel of a liquid crystal display, the component comprising:

a plate consisting of a first layer and a second layer, the plate including a first major surface, a second major surface opposing the first major surface, and an edge joining the first and second major surfaces, the first major surface configured to allow a majority of incident light from a light source to be transmitted therethrough and defining a first side of the first layer, the second major surface configured to receive a portion of the transmitted incident light from the first layer and defining a first side of the second layer, wherein:

the first layer is a single, discrete structure having a microscopically varying refraction index, the first layer adapted to diffusely backscatter a portion of incident light entering the first layer and to depolarize a plane of polarization of the portion of incident light passing through the first layer, the second layer is in contact with and adjacent to the first layer and is configured to be substantially index-matched to the first layer and substantially nonabsorbent to allow passage of light through the second major surface having a plane of polarization that is substantially aligned with a predetermined polarization axis of the display panel, and to substantially prevent passage of light through the second major surface having a plane of polarization that is not substantially aligned with the predetermined polarization axis of the display panel, incident light is not injected between the first layer and the second layer and is not injected through the plate edge, and incident light reaching the second layer but not passing through the second major surface is returned to the first layer where a portion of the returned incident light is depolarized and diffusely backscattered in the first layer and directed toward the second layer.

2. The component of claim 1, wherein the first major surface of the plate has a texture formed thereon.

3. The component of claim 1, wherein the second layer is further configured to diffuse light.

4. The component of claim 1, wherein the second layer is further configured to reflect light.

5. The component of claim 1, wherein the second layer is further configured to backscatter light.

6. A component for use between a light source and a display panel of a liquid crystal display, the component comprising:

a plate consisting of a first layer and a second layer bonded together to form a single structure having a first major surface, a second major surface opposing the first major surface, and an edge joining the first and second major surfaces, the first major surface configured to allow a majority of incident light from a light source to be transmitted therethrough and defining a first side of the first layer, the second major surface configured to receive a portion of the transmitted incident light from the first layer and defining a first side of the second layer, the second major surface being adjacent to air, wherein:

the first layer is a single film having a microscopically varying refraction index, the first layer adapted to diffusely backscatter a portion of incident light entering the first layer and to depolarize a plane of polarization of the portion of incident light passing through the first layer, the second layer is laminated over to be in contact with and adjacent to the first layer and is a single film configured to be substantially index-matched to the first layer and substantially nonabsorbent to allow passage of light through the second major surface having a plane of polarization that is substantially aligned with a predetermined polarization axis of the display panel, and to substantially prevent passage of light through the second major surface having a plane of polarization that is not substantially aligned with the predetermined polarization axis of the display panel, incident light is not injected between the first layer and the second layer and is not injected through the plate edge, and incident light reaching the second layer but not passing through the second major surface is returned to the first layer where a portion of the returned incident light is depolarized and diffusely backscattered in the first layer and directed toward the second layer.

7. A display device, comprising:

a light source;

a reflective surface disposed proximate the light source and configured to reflect light emitted therefrom;

a polarized display panel spaced apart from the reflective surface, the polarized display panel having a predetermined polarization axis; and a plate disposed between the reflective surface and the polarized display panel and configured to receive the reflected light, the plate consisting of a first layer and a second layer, the plate including a first major surface, a second major surface opposing the first major surface, and an edge joining the first and second major surfaces, the first major surface configured to allow a majority of the reflected light to be transmitted therethrough and defining a first side of the first layer, the second major surface configured to receive a portion of the reflected light from the first layer and defining a first side of the second layer, wherein:

the first layer is a single, discrete structure having a microscopically varying refraction index, the first layer adapted to diffusely backscatter a portion of the reflected light entering the first layer and to depolarize a plane of polarization of the reflected light passing through the first layer, the second layer is in contact with and adjacent to the first layer and is configured to be substantially index-matched to the first layer and substantially nonabsorbent to allow passage of light through the second major surface having a plane of polarization that is substantially aligned with a predetermined polarization axis, and to substantially prevent passage of light through the second major surface having a plane of polarization that is not substantially aligned with the predetermined polarization axis, incident light is not injected between the first layer and the second layer and is not injected through the plate edge, and the reflected light reaching the second layer but not passing through the second major surface is returned to the first layer where a portion of the returned reflected light is depolarized and diffusely backscattered in the first layer and directed toward the second layer.

* * * * *